(12) United States Patent
Senn

(10) Patent No.: US 9,073,253 B2
(45) Date of Patent: Jul. 7, 2015

(54) APPARATUS AND METHOD FOR HEATING CONTAINERS

(75) Inventor: Konrad Senn, Regensburg (DE)

(73) Assignee: KRONES, AG, Neutraubling (DE)

( * ) Notice: Subject to any disclaimer, the term of this patent is extended or adjusted under 35 U.S.C. 154(b) by 1459 days.

(21) Appl. No.: 12/401,883

(22) Filed: Mar. 11, 2009

(65) Prior Publication Data

US 2009/0230124 A1 Sep. 17, 2009

(30) Foreign Application Priority Data

Mar. 13, 2008 (DE) .......................... 10 2008 014 215

(51) Int. Cl.
| | |
|---|---|
| H05B 6/64 | (2006.01) |
| B29C 67/00 | (2006.01) |
| B29C 49/64 | (2006.01) |
| B29C 49/12 | (2006.01) |
| B29C 49/36 | (2006.01) |
| B29C 35/04 | (2006.01) |
| B29C 35/08 | (2006.01) |
| B29K 67/00 | (2006.01) |

(52) U.S. Cl.
CPC ............. B29C 49/6445 (2013.01); *B29C 49/12* (2013.01); *B29C 49/36* (2013.01); *B29C 2035/046* (2013.01); *B29C 2035/0855* (2013.01); *B29K 2067/00* (2013.01)

(58) Field of Classification Search
CPC .................. B29C 2035/046; B29C 2035/0855; B29C 49/12; B29C 49/36; B29C 49/6445; B29K 2067/00
USPC ......... 219/679, 681, 680, 678, 701, 710–711, 219/729–731, 736, 748–750, 759, 761; 264/489, 405, 417, 420, 425–426, 432, 264/459, 474, 479
See application file for complete search history.

(56) References Cited

U.S. PATENT DOCUMENTS

| | | | | |
|---|---|---|---|---|
| 3,775,524 | A | * | 11/1973 | Seefluth .......................... 64/521 |
| 3,830,893 | A | * | 8/1974 | Steingiser ....................... 64/489 |
| 4,268,975 | A | | 5/1981 | Schall et al. |
| 4,375,441 | A | * | 3/1983 | Adams et al. ................. 264/460 |

(Continued)

FOREIGN PATENT DOCUMENTS

| | | |
|---|---|---|
| CN | 1191797 | 9/1998 |
| CN | 1994723 | 7/2007 |

(Continued)

OTHER PUBLICATIONS

Search Report issued on Jun. 26, 2009 in corresponding European Patent Application No. 09154945.1.

(Continued)

*Primary Examiner* — Dana Ross
*Assistant Examiner* — Ket D Dang
(74) *Attorney, Agent, or Firm* — Onello & Mello, LLP.

(57) ABSTRACT

The invention relates to an apparatus and method for heating containers and in particular preforms. The apparatus comprising a microwave heating device which has a microwave generator and a microwave conductor, and a transport device which transports the containers. The apparatus can further comprise a further heating device which heats the containers, wherein the further heating device is a pre-heating unit which is arranged upstream of the microwave heating device in the transport direction of the containers.

20 Claims, 3 Drawing Sheets

(56) References Cited

U.S. PATENT DOCUMENTS

| | | | | |
|---|---|---|---|---|
| 4,687,396 | A | * | 8/1987 | Berecz ............... 411/503 |
| 5,217,656 | A | * | 6/1993 | Buckley et al. ............ 264/490 |
| 5,304,766 | A | * | 4/1994 | Baudet et al. ............ 219/687 |
| 5,447,077 | A | * | 9/1995 | Lautenschlager ......... 73/863.11 |
| 5,512,734 | A | * | 4/1996 | Copstead ............ 219/679 |
| 5,540,357 | A | * | 7/1996 | Malofsky ............ 222/105 |
| 5,620,659 | A | * | 4/1997 | Revesz ............... 422/90 |
| 5,718,853 | A | | 2/1998 | Ingram |
| 5,796,080 | A | * | 8/1998 | Jennings et al. ............ 219/697 |
| 6,080,353 | A | | 6/2000 | Tsuchiya |
| 6,258,313 | B1 | * | 7/2001 | Gottlieb ............ 264/458 |
| 6,349,838 | B1 | * | 2/2002 | Saito et al. ............ 215/371 |
| 6,789,689 | B1 | * | 9/2004 | Beale ............ 215/398 |
| 6,808,672 | B2 | * | 10/2004 | Stewart et al. ............ 264/489 |
| 6,888,103 | B2 | | 5/2005 | Vaughn et al. |
| 7,967,002 | B2 | * | 6/2011 | Inada et al. ............ 126/21 A |
| 8,231,823 | B2 | | 7/2012 | Humele et al. |
| 2003/0222071 | A1 | | 12/2003 | Vaughn et al. |
| 2006/0103052 | A1 | * | 5/2006 | Reetz et al. ............ 264/320 |
| 2006/0127615 | A1 | * | 6/2006 | Kikuchi et al. ............ 428/35.7 |
| 2007/0023975 | A1 | * | 2/2007 | Buckley ............ 264/494 |
| 2007/0290415 | A1 | * | 12/2007 | Suenaga et al. ............ 264/532 |
| 2008/0063886 | A1 | * | 3/2008 | Kitano et al. ............ 428/542.8 |
| 2010/0052224 | A1 | * | 3/2010 | Humele et al. ............ 264/489 |

FOREIGN PATENT DOCUMENTS

| | | | | |
|---|---|---|---|---|
| DE | 3020150 | A1 | | 7/1981 |
| DE | 19633467 | A1 | | 2/1998 |
| DE | 10 2006 015 745 | | | 10/2006 |
| DE | 10 2007 022 386 | | | 11/2007 |
| DE | 102007022386 | A1 | * | 11/2007 |
| DE | 10 2007 034 486 | | | 2/2009 |
| EP | 0860265 | A1 | | 8/1998 |
| EP | 1155798 | A1 | | 11/2001 |
| EP | 1366886 | A1 | | 12/2003 |
| EP | 1384563 | A1 | | 1/2004 |
| EP | 1777053 | A2 | | 4/2007 |
| JP | 62270315 | A | * | 11/1987 ............. B29C 49/22 |
| JP | 9 295342 | | | 11/1997 |
| WO | WO 2005075892 | A1 | * | 8/2005 ............... F24C 1/00 |
| WO | WO2007131701 | | | 11/2007 |

OTHER PUBLICATIONS

German Search Report dated Jan. 11, 2013 issued in corresponding German patent application No. 10 2008 014 215.8.

Chinese Office Action issued in Corresponding Chinese Patent Application No. 200910118785.1.

* cited by examiner

APPARATUS AND METHOD FOR HEATING CONTAINERS

RELATED APPLICATIONS

This application relies for priority upon German Patent Application No. 10 2008 014 215.8, filed on Mar. 13, 2008, the contents of which are herein incorporated by reference in their entirety.

DESCRIPTION

The present invention relates to an apparatus for heating containers and in particular preforms.

In the prior art, there has recently been a changeover to using plastic containers instead of glass containers. During the production of these plastic containers, plastic preforms are used which are expanded by means of compressed air. To allow or to facilitate this expansion process, the preforms are usually transported through a heating section.

DE 30 20 150 A1 discloses such an apparatus for pre-heating thermoplastic preforms. In order to heat the preforms, hot air is used to pre-heat the preforms in their entirety and to pre-heat all parts substantially to the same temperature.

EP 1 366 886 A1 describes a pre-heating device for preforms. In this case, a certain temperature variance is intended to be achieved within the preform in order in this way to increase the quality of the product produced.

U.S. Pat. No. 5,718,853 discloses an apparatus for pre-treating containers prior to the heating thereof. This is intended to achieve the result that the thermal energy absorbed by each preform is the same and is uniformly distributed over the preform.

It is also known from the applicant's internal prior art to use not infrared radiation to heat the preforms but rather microwave radiation instead or optionally in addition. The use of microwave radiation allows faster heating of the preforms.

Due to the principles of physics, for microwave heating a resonator cavity is required and therefore here the process cannot take place continuously as in the case of an infrared heating process, but rather individual microwave stations must be used. In order to keep as small as possible the number of stations required, the process time should be kept as brief as possible. The heat output by the microwave to the material is proportional to the square of the electric field and to the dielectric loss factor:

$$P_{heat} \propto \in" \cdot E^2$$

The object of the present invention is to increase the efficiency of microwave-based heating devices for preforms. The throughput of such heating devices is also intended to be increased.

This is achieved according to the invention by an apparatus for heating containers and a method for heating containers.

Advantageous embodiments and further developments form the subject matter of the dependent claims.

An apparatus according to the invention for heating containers and in particular preforms comprises a microwave heating device which has a microwave generator and a microwave conductor. In addition, the apparatus comprises a transport device which transports the containers. According to the invention, the apparatus comprises a further heating device which heats the containers, wherein the further heating device is a pre-heating unit which is arranged upstream of the microwave heating device in the transport direction of the containers. A pre-heating unit is understood here to mean a heating unit which per se does not bring about the complete heating of the preforms but rather pre-heats the preforms prior to a subsequent heating process.

It is thus proposed according to the invention to pre-heat the containers by means of the further heating device in order then to supply said containers to the heating process by the microwave generating unit. As mentioned above, the heat output by the microwave to the material also depends on the loss factor $\in"$. Since the electric field of the microwave cannot be operated as high as desired since otherwise there is a risk of plasma ignition, it is proposed according to the invention to increase the heat output via the dielectric loss factor.

For this, the invention makes use of the temperature-dependence of the dielectric loss factor. It has been found in complex tests that the dielectric loss factor of PET rises to approximately four times the value in a temperature range between 10 and 100 degrees Celsius (° C.). By pre-heating the preforms, therefore, the loss factor can be increased and thus the heat output can accordingly also be increased for a constant electric field.

Preferably, the heating device comprises an air supply unit which subjects the containers to a heated air flow. The containers are thus subjected here in particular to hot air for pre-heating purposes, in order in this way to increase the efficiency of the microwave heating device. Preferably, the microwave heating device comprises a resonator.

In one advantageous embodiment, the apparatus comprises a heat exchanger which is in heat-exchanging connection with the microwave generating unit or the microwave generator. During the microwave heating of preforms, waste heat arises in the magnetron, that is to say the microwave source, which waste heat accounts for more than 30% of the total energy. This thermal energy is usually conveyed away from the magnetron by a cooling water circuit and dissipated to the environment via a heat exchanger in the prior art. In this preferred embodiment, it is proposed also to use this energy to heat the PET preforms. In this way, the energy efficiency of the apparatus as a whole can be increased. Furthermore, it is possible to further heat via additional means the air heated by the heat exchanger, so that a temperature level is reached which lies above that of the heat exchanger. This may be useful in particular since any pre-heating has a positive effect on the ability to be further processed by microwave radiation.

It should also be noted that in the case of microwave heating, due to the geometry of the preforms, the inner side is heated to a greater extent than the outer side. To counteract this temperature gradient between the outer wall and the inner wall, the heating device is preferably designed in such a way that it heats in particular the outer side of the preforms. In this way, a gradient in the opposite direction can be applied beforehand to the preform, so that overall a uniform heating of the preform can be achieved, i.e. the result can be achieved that the two gradients more or less cancel one another out. In this embodiment, it is therefore proposed that the further heating device is designed in such a way that primarily an outer wall of the containers is heated, for example heated air is guided onto the outer wall of the containers.

In a further advantageous embodiment, the heating device is designed in such a way that it subjects locally different regions of the containers to heat in different ways. More specifically, the preform can in this case be pre-heated in a targeted manner in certain zones by means of one individual supply. In the case of heating by microwave radiation, certain problem zones arise, such as for example the base dome in the lower region of the preform. It is possible to heat these problem zones to a greater extent, the mouth piece or the thread for example on the other hand not being heated or even being cooled at the same time. It is also possible to pre-heat the preform only in certain zones.

In a further advantageous embodiment, the apparatus comprises a transport device, wherein this transport device has at least two different temperature zones, in which different regions of the containers are heated differently. For example, the containers may be guided through a channel and two different temperature zones may be formed within this channel. The thread of the container may in this case be arranged above this channel. In this way, it is possible to prevent any heating of the thread.

The containers are transported through this transport channel, the transport channel being defined here by side walls and a bottom.

Preferably, a shielding device is provided which prevents a threaded region of the containers from being heated. The threaded region of the containers is very sensitive during processing of the containers, since excessive heating leads to a deformation thereof and may consequently lead to the entire preform being destroyed.

The present invention also relates to a system for expanding preforms to form containers, comprising an apparatus of the type described above and a blowing device which is arranged after the apparatus in a transport direction of the containers and which expands the preforms using compressed air to form containers. Here, the preforms heated by the above-described apparatus are expanded in blowing stations in the context of a blowing/stretching process to form containers. In order to carry out this blowing process, a suitable heating of the containers is required. Preferably, the apparatus for heating the containers is designed in such a way that the containers to be heated are guided individually at least in some sections and are transferred individually to the downstream blowing device.

The present invention also relates to a method for heating containers and in particular preforms, wherein the containers are transported by means of a first transport device and during this transport are subjected to microwave radiation by a microwave heating device for heating purposes. According to the invention, the containers are heated by means of a further heating device prior to being subjected to the microwave radiation.

Preferably, the further heating device for heating the containers uses waste heat from the microwave heating device.

In a further advantageous method, different regions of the containers are heated differently by the further heating device. By virtue of this procedure, as mentioned above, certain problem zones of the containers can be heated to a greater extent than others, in order in this way to achieve overall a uniform heating by the microwave device.

In a further preferred method, the region of the containers that is to be heated is continuously moved and/or heated and in particular is continuously moved relative to the microwave heating device. Preferably, the containers are guided individually relative to the further heating device.

Preferably, a region of the containers is not heated by the microwave heating device, this particularly preferably being, as mentioned above, a mouth region or threaded region of the containers. Preferably, this region is also not heated by the further heating device or is shielded to prevent heating by the heating device.

In a further preferred method, the containers are transported through the microwave heating device in a direction perpendicular to a longitudinal axis of the containers during the heating process. This means that the containers are preferably transported upright.

In a further preferred method, the heating device heats a middle region of the containers to a temperature between 40 and 60 degrees Celsius and preferably between 45 and 55 degrees Celsius. By pre-heating from 15 degrees to around 55 degrees Celsius, the loss factor is approximately doubled and therefore, as mentioned above, the heat output also approximately doubles. A middle region of the containers is understood in particular to mean the section between the support ring and the base dome.

In a further preferred method, the heating device heats a lower region of the containers to a temperature between 50 degrees Celsius and 80 degrees Celsius and preferably between 60 degrees Celsius and 70 degrees Celsius. As mentioned above, this lower region of the containers is a problem zone, i.e. a greater heating of the base dome results overall in a uniform heating by the microwave heating device.

Further advantages and embodiments will emerge from the appended drawings:

Figure 1:
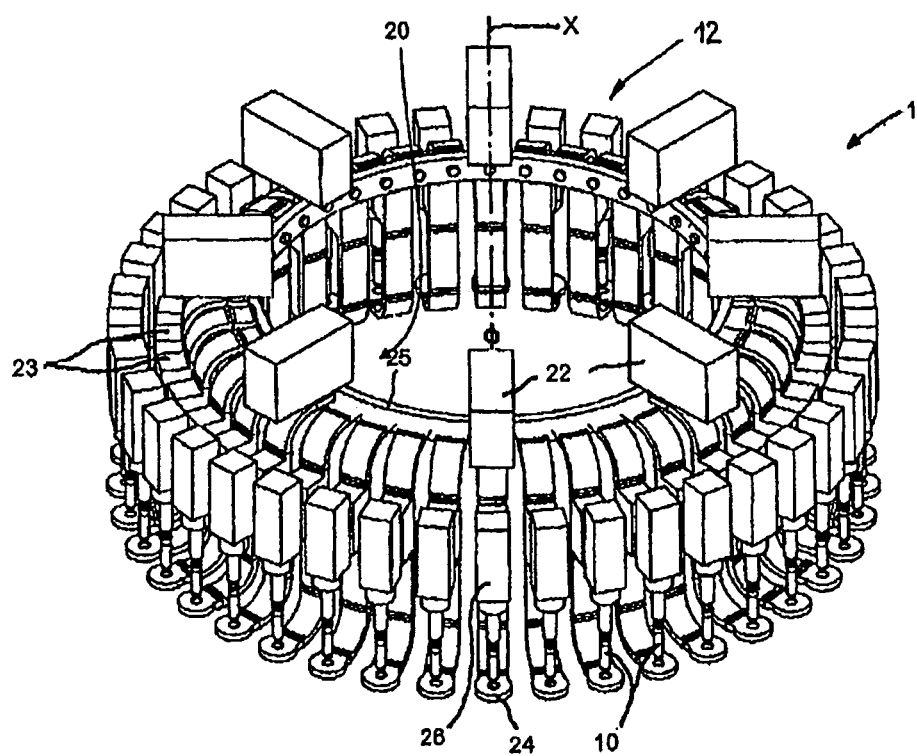
FIG. 1 shows a heating apparatus for preforms comprising microwave heating devices.

FIG. 1 shows a circular heating apparatus 1 for preforms 10 (e.g., containers), wherein the latter are moved in the course of the heating process along the periphery of the heating apparatus, i.e. in this case on a circular path. For this purpose, a first transport device is provided, which is denoted as a whole by 12. The heating apparatus comprises a carrier 25 which at the same time is designed as a rectangular hollow line, i.e. acts as a waveguide. Various structural units, such as e.g. 8 microwave generators 22, are attached to this carrier. The units attached to the carrier revolve together about a machine axis X.

Reference 24 denotes a resonator which here forms part of the microwave heating unit. This resonator 24 is a disc-shaped or plate-shaped element which is hollow internally and in the centre of which a circular hole is arranged. The outer dimensions of this circular hole are selected in such a way that preforms which are to be heated can be passed through said hole, the resonator 24 having a height which corresponds to just part of the height of the preforms.

Reference 26 denotes a movement unit, by means of which the preforms can be moved relative to the resonator. Reference 23 denotes a microwave tuner, by means of which it is possible to influence the microwaves by varying the conductor space of the microwave heating unit, i.e. for example the field strength distribution with the preforms inserted must be optimised in such a way that the amount of energy which is reflected and which is not absorbed by the preform is minimised. The apparatus shown in FIG. 1 has been described in detail in German patent application No. [102007022386.4] by the applicant, which has not yet been laid open and the content of the disclosure of which is hereby fully incorporated by way of reference in the disclosure of the present application.

Figure 2:
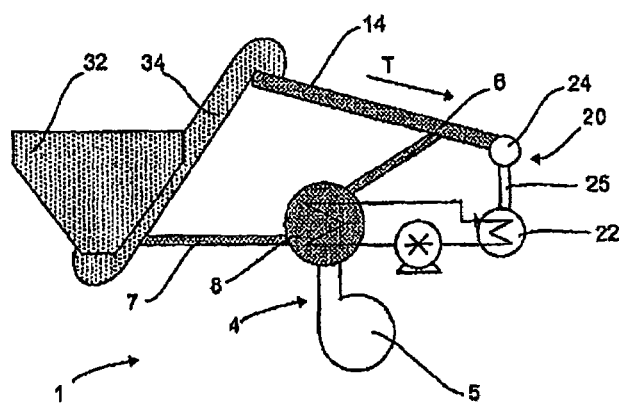
FIG. 2 shows a schematic view to illustrate an apparatus according to the invention for heating containers.

FIG. 2 shows a schematic view of an apparatus according to the invention to illustrate the invention. Here, too, a microwave heating unit 20 is once again shown, which comprises a resonator 24 and a microwave conductor 25. The microwave heating unit 20 is in heat-exchanging connection with the further heating device for the containers, which is denoted as a whole by 4. In this way, the waste heat from the microwave heating device is used to pre-heat the containers. More specifically, reference 8 denotes a heat exchanger, by means of which heated air is produced. Reference 5 denotes a fan, by means of which heated air can be supplied to the containers.

The heat which arises throughout the entire microwave process, i.e. in particular the waste heat from the magnetron, water load and hollow conductor cooling, is collected in a cooling water circuit and conveyed to the heat exchanger 8. The latter outputs the heat to an air flow produced by the ventilator or fan 5. The air flow then flows over the preforms, before the latter are heated by the microwave heating device. It is possible either to blow or to suck the heated air. It is possible to supply heat via a supply line 7 to a chute 32 in which the preforms are arranged. Reference 34 denotes a transport device such as an upwardly inclined belt which supplies the preforms to a further transport device 14. The preforms 10 are transported in a transport direction T. In this region, too, heated air can be supplied to a preform via an air supply line 6. In this region, it is also possible to supply hot air to the preforms that have already been separated. During transport on the upwardly inclined belt 34, the containers 10 may also optionally be heated using a further air supply device (not shown). In addition, it is possible to supply additional heat to the air via an additional device (not shown). As a result, a heating of the air flow to beyond the level of the heat exchanger takes place. A very efficient microwave heating can thus be ensured.

Furthermore, it would also be possible to use a specially extended single supply for the preforms, in which the preforms remain for a longer period of time in order in this way to be heated for a longer period of time. In this case it is possible, as will be explained in more detail below, that the heated air is at different temperatures in different regions of the preforms. If the preforms are already heated in the chute 32, use is made here of hot air at a temperature between 25 degrees and 40 degrees Celsius, preferably between 25 and 35 degrees and particularly preferably approximately 30 degrees. For heating in the transport device 14, use may be made of hot air at a temperature of approximately 60 degrees.

Figure 3:
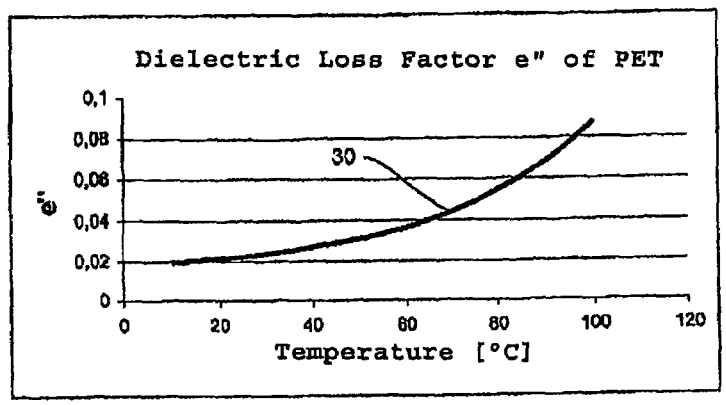
FIG. 3 shows a diagram to illustrate the dependence between the dielectric loss factor and the temperature.

FIG. 3 shows a diagram to illustrate the dependence between the dielectric loss factor $\in''$ of PET and the temperature along the curve 30. It can be seen that the dielectric loss factor increases by the factor 3 in a temperature range between 20 and 80 degrees Celsius. Even a heating of the preforms to approximately 60 degrees Celsius results in a doubling of the dielectric loss factor and thus of the heat absorption of PET.

Figure 4:
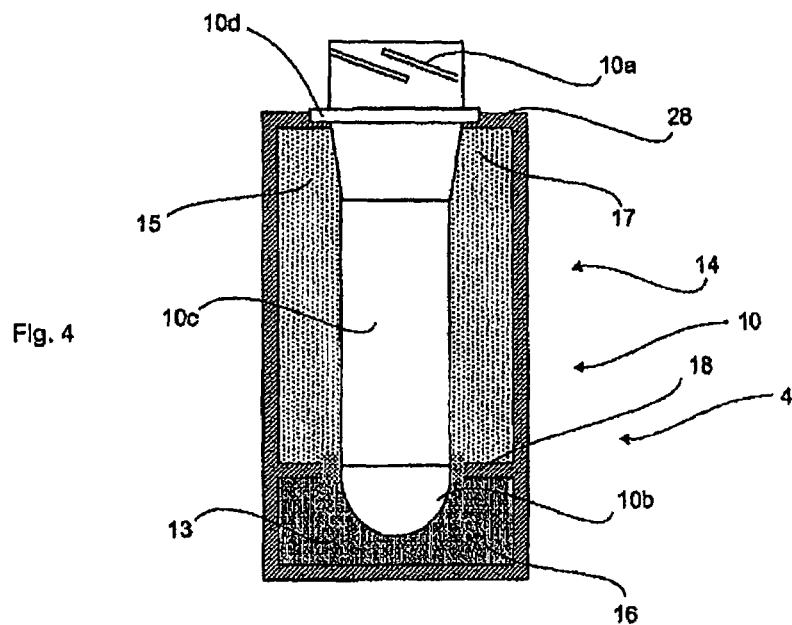
FIG. 4 shows a partial view of a heating device for an apparatus according to the invention.

FIG. 4 shows only a partial view of the heating device 4, more specifically a section of the transport device 14. In this embodiment, the transport device 14 has temperature zones 16 and 17 which are formed within two chambers or transport channels 15 and 13. Here, different regions of the container 10 are heated differently. For example, a bottom or base dome region 10b is heated differently compared to the middle region 10c of the container 10.

It would also be possible that the heated air is also used for transporting or for conveying the preforms or the transport device 14 is designed as an air conveyor, or that the heated air is supplied in such a way as to at least assist the transport of the preforms.

A support ring 10d of the container 10 can in this case be supported against an outer wall or upper side 28 of the transport device 14. In this way it is possible to guide the threaded region 10a of the preform outside the transport device and therefore not to heat it. The upper side 28 therefore acts at the same time as a shielding device. The threaded region 10a is thus in a temperature environment at room temperature. In this way, the preform 10 can be pre-heated in a targeted manner in certain zones. Here, the base dome 10b, which is a problem zone, is heated to a greater extent, for example to temperatures of approximately 65 degrees Celsius. In this embodiment of the container, the middle region 10c of the container can be heated to temperatures of 50 degrees Celsius. In addition, it would even be possible to cool the threaded region 10a since it is located outside the transport device 14.

Reference 18 denotes webs which separate the two temperature zones 16 and 17 from one another. It thus becomes possible to supply the lower temperature zone 16 and the upper temperature zone 17 with air at different temperatures, preferably by means of different supply lines.

The temperatures for pre-heating the preforms 10 are preferably as high as possible but are preferably below the glass transition temperature of the material. In the case of PET, this lies in a range from approximately 70 to 75 degrees Celsius. Furthermore, before separating the preforms in the chute 32 shown in FIG. 2, the temperature should not be too high so that the preforms do not stick to one another and then hinder the separation process. As mentioned above, the preferred temperature in this region is between 30° C. and 40° C. It should also be noted that the mouth piece 10a and also the support ring 10d of the preforms 10 should not be heated above 50 degrees Celsius.

Figure 5:
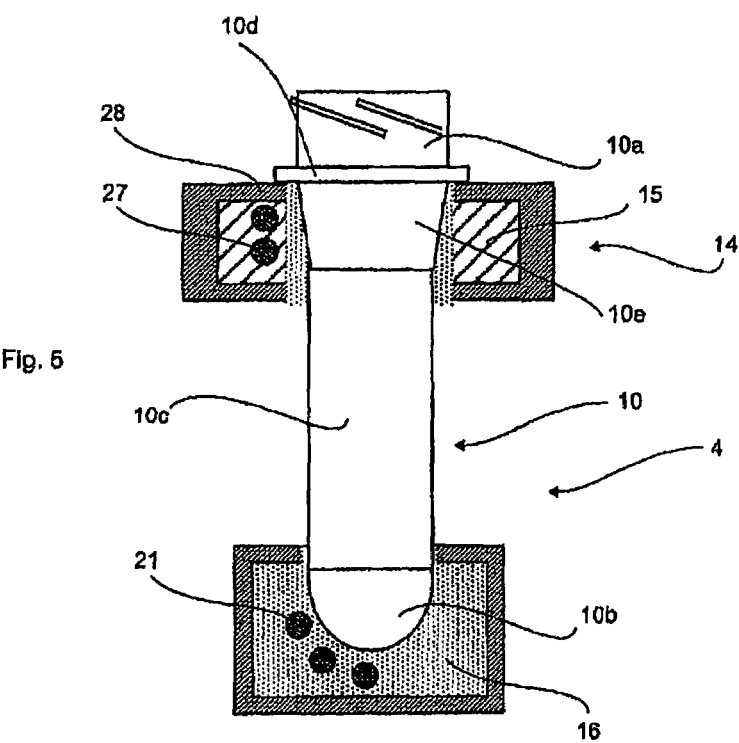
FIG. 5 shows a partial view of a further heating device for an apparatus according to the invention.

FIG. 5 shows a further embodiment of the apparatus according to the invention. In this embodiment, infrared emitters 27 and 21 are additionally used in the temperature zones 15 and 16, which bring about an additional heating of the critical base dome region 10b and of a region 10e below the support ring 10d. By means of these additional infrared emitters or infrared heating units 21, 27, it is possible to correct (upwardly) the temperature in these regions beforehand or subsequently.

All of the features disclosed in the application documents are claimed as essential to the invention in so far as they are novel individually or in combination with respect to the prior art.

The invention claimed is:

1. Apparatus for heating container preforms, comprising:
   a microwave heating device which has a microwave generator and a microwave conductor;
   a transport device which transports the container preforms shaped and designed to be subsequently blown to containers;
   a further heating device which heats the containers preforms, wherein the further heating device is a pre-heating unit which is arranged upstream of the microwave heating device, wherein the further heating device comprises an air supply unit which subjects the container preforms to a heated air flow during a transport of the container preforms by a further transport device which supplies the container preforms to another transport device, and wherein the another transport device transports the container preforms along a transport direction to the microwave heating device, and
   a chute that supplies the container preforms to the further transport device, wherein the outer wall of the container preforms are pre-heated by the further heating device using hot air, and wherein the hot air is introduced to the chute from the further heating device via a supply line for further heating of the preform in the chute.

2. The apparatus according to claim 1, wherein the apparatus comprises a heat exchanger which is in heat-exchanging connection with the microwave generating unit.

3. The apparatus according to claim 1, wherein the further heating device is constructed and arranged such that it subjects locally different regions of the containers to heat in different ways.

4. The apparatus according to claim 1, wherein the other transport device has at least two different temperature zones, in which different regions of the containers preforms are heated differently.

5. The apparatus according to claim 4, wherein the another transport device has a transport channel, through which the container preforms are transported.

6. The apparatus according to claim 4, wherein the temperature zones are formed at two chambers or transport channels, and wherein one or more webs separate the temperature zones from one another.

7. The apparatus according to claim 1, further comprising a shielding device that prevents a threaded region of the containers from being heated.

8. System for expanding preforms to form containers, comprising:
an apparatus comprising:
a microwave heating device which has a microwave generator and a microwave conductor;
a transport device which transport the preforms; and
a further heating device which pre-heats the preforms, wherein the further heating device is a pre-heating unit which is arranged upstream of the microwave heating device, and wherein the further heating device comprises an air supply unit which subjects the preforms to a heated air flow during a transport of the preforms by a further transport device which supplies the preforms containers to another transport device, a wherein the another transport device transports the preforms containers along a transport direction to the microwave heating device, the system further comprising:
a chute that supplies the container preforms to the further transport device, wherein the outer wall of the container preforms are pre-heated by the further heating device using hot air, and wherein the hot air is introduced to the chute from the further heating device via a supply line for further heating of the preform in the chute; and
a blowing device which is arranged after the apparatus in a transport direction of the preforms and which expands the preforms using compressed air to form the containers.

9. Method for heating containers preforms, comprising:
a chute that supplied the container preforms to further transport device, wherein the outer wall of the container preforms are pre-heated by the further heating device using hot air, and wherein the hot air is introduced to the chute from the further heating device via a supply line for further heating of the preform in the chute;
transporting the containers preforms using a first transport device, the container preforms shaped and designed to be subsequently blown to containers;
heating the container preforms during transportation, wherein the containers are subjected to microwave radiation by a microwave heating device for heating purposes; and
pre-heating the containers preforms using a further heating device prior to being subjected to the microwave radiation;
subjecting the container preforms to a heated air flow during a transport of the containers by a further transport device which supplies the container preforms to another transport device, and wherein the another transport device transports the container preforms along a transport to the microwave heating device.

10. The method according to claim 9, wherein the further heating device for heating the container preforms uses waste heat from the microwave heating device.

11. The method according to claim 9, wherein different regions of the container preforms are heated differently by the further heating device.

12. The method according to claim 9, wherein a region of the container preforms that is to be heated is at least one continuously moved or heated.

13. The method according to claim 9, wherein a region of the container preforms is shielded to prevent heating by the further heating device.

14. The method according to claim 9, wherein the further heating device heats a middle region of the container preforms to a temperature in a range selected from a group of ranges consisting of: between about 40° C. and 60° C.; and between 45° C. and 55° C.

15. The method according to claim 9, wherein the further heating device heats a lower region of the containers preforms to a temperature in a range selected from a group of ranges consisting of: between about 50° C. and 80° C.; and between 60° C. and 70° C.

16. The apparatus according to claim 1, wherein the further heating device heats an outer wall of the containers.

17. The apparatus according to claim 1, further comprising a fan that provides heated air to the containers.

18. The method according to claim 9, wherein the hot air has a temperature between 23° C. and 40° C.

19. The method according to claim 9, wherein the hot air has a temperature between 25° C. and 35° C.

20. The method according to claim 9, wherein the hot air has a temperature of 30° C.

* * * * *